(12) United States Patent
Breaux (10) Patent No.: US 12,179,054 B2
(45) Date of Patent: Dec. 31, 2024

(54) AUTOMATIC SPOTTER LIFT FORCE CALCULATOR AND DISPLAY DEVICE AND METHOD OF USE

(71) Applicant: Russell Breaux, Sunset, TX (US)

(72) Inventor: Russell Breaux, Sunset, TX (US)

(*) Notice: Subject to any disclaimer, the term of this patent is extended or adjusted under 35 U.S.C. 154(b) by 383 days.

(21) Appl. No.: 17/448,122

(22) Filed: Sep. 20, 2021

(65) Prior Publication Data

US 2023/0086790 A1 Mar. 23, 2023

(51) Int. Cl.
| | | |
|---|---|---|
| A63B 21/072 | (2006.01) | |
| A63B 21/00 | (2006.01) | |
| A63B 24/00 | (2006.01) | |
| A63B 71/06 | (2006.01) | |
| G01G 3/14 | (2006.01) | |
| G01G 19/52 | (2006.01) | |

(52) U.S. Cl.
CPC .... *A63B 21/00181* (2013.01); *A63B 21/0724* (2013.01); *A63B 24/0062* (2013.01); *A63B 71/06* (2013.01); *A63B 2220/51* (2013.01); *A63B 2220/52* (2013.01); *G01G 3/1402* (2013.01); *G01G 19/52* (2013.01)

(58) Field of Classification Search
None
See application file for complete search history.

(56) References Cited

U.S. PATENT DOCUMENTS

| | | | | |
|---|---|---|---|---|
| 4,647,038 | A * | 3/1987 | Noffsinger | A63B 21/4035 482/901 |
| 4,882,677 | A | 11/1989 | Curran | |
| 6,632,159 | B1 * | 10/2003 | Slattery | A63B 21/078 482/4 |
| 7,608,025 | B1 | 10/2009 | Best | |
| 7,651,442 | B2 | 1/2010 | Carlson | |
| 7,819,785 | B2 * | 10/2010 | Maiaro | A63B 21/0626 482/4 |
| 8,187,152 | B2 | 5/2012 | Gravel et al. | |
| 8,900,097 | B1 * | 12/2014 | Griggs | A63B 21/4043 482/4 |
| 9,138,612 | B2 | 9/2015 | Breaux | |
| 9,254,410 | B1 * | 2/2016 | Mirza | A63B 23/12 |

(Continued)

FOREIGN PATENT DOCUMENTS

| | | |
|---|---|---|
| CN | 205886042 U | 1/2017 |
| CN | 105709399 B | 1/2018 |

(Continued)

OTHER PUBLICATIONS

"Tonal," tonal.com. https://web.archive.org/web/20210603165141/https://www.tonal.com/product/tonal/ last accessed Jun. 3, 2021.

(Continued)

*Primary Examiner* — Shila Jalalzadeh Abyaneh (74) *Attorney, Agent, or Firm* — Schultz & Associates, P.C.

(57) ABSTRACT

A system for measuring actual weight lifted by a user when a spotting force is applied and calculating a spotting force. The system is comprised of a display device and sensors having strain gauges attached to a weight lifting bar. The system will determine and display the actual weight lifted by a user with or without a spotting force, and a spotting force applied.

21 Claims, 7 Drawing Sheets

(56) References Cited

U.S. PATENT DOCUMENTS

| | | | |
|---|---|---|---|
| 9,375,602 | B2 | 6/2016 | Krull |
| 9,409,053 | B1* | 8/2016 | Todd ..................... G16H 20/30 |
| 9,802,075 | B2 | 10/2017 | Gvoich |
| 10,456,614 | B1* | 10/2019 | Dube ................. A63B 24/0062 |
| 10,732,058 | B2 | 8/2020 | Chen |
| 10,918,901 | B2 | 2/2021 | Orfield |
| 11,471,723 | B2* | 10/2022 | Gao ................... A63B 71/0619 |
| 11,944,869 | B2* | 4/2024 | Schmidt .............. A63B 71/0622 |
| 2004/0176224 | A1* | 9/2004 | Slawinski ................. G05F 1/45 |
| | | | 482/93 |
| 2005/0233871 | A1* | 10/2005 | Anders ................ A63B 21/078 |
| | | | 482/8 |
| 2008/0119763 | A1* | 5/2008 | Wiener .................. A61B 5/224 |
| | | | 600/587 |
| 2012/0058859 | A1* | 3/2012 | Elsom-Cook .... A63B 21/00181 |
| | | | 482/4 |
| 2013/0102440 | A1 | 4/2013 | Hutchins et al. |
| 2013/0190143 | A1* | 7/2013 | Greenhill ......... A63B 21/00181 |
| | | | 482/104 |
| 2014/0342878 | A1* | 11/2014 | Hashish ............... A63B 21/045 |
| | | | 482/8 |
| 2015/0190678 | A1* | 7/2015 | Golsby .............. A63B 24/0087 |
| | | | 482/4 |
| 2016/0158603 | A1* | 6/2016 | Darwood ........... A63B 24/0062 |
| | | | 482/5 |
| 2018/0056127 | A1* | 3/2018 | Den Hollander .... A63B 21/063 |
| 2018/0064992 | A1* | 3/2018 | Rothman ............... H04N 7/188 |
| 2018/0064994 | A1* | 3/2018 | Back ................. A63B 21/0783 |
| 2018/0290001 | A1* | 10/2018 | Baek ..................... A63B 17/04 |
| 2019/0041282 | A1* | 2/2019 | Chen ..................... G01L 1/2293 |
| 2019/0293480 | A1 | 9/2019 | Burck et al. |
| 2020/0023226 | A1* | 1/2020 | Silveira .............. A63B 21/0626 |
| 2020/0289890 | A1* | 9/2020 | Kim ........................ G01C 19/00 |
| 2020/0353303 | A1* | 11/2020 | Hammond ........... A63B 21/072 |
| 2021/0023416 | A1 | 1/2021 | Yu et al. |
| 2021/0394011 | A1* | 12/2021 | Neuhaus .............. A63B 21/151 |
| 2022/0184446 | A1* | 6/2022 | Mino ................. A63B 24/0062 |
| 2022/0323812 | A1* | 10/2022 | O'Connor ........ A63B 21/00181 |
| 2024/0009522 | A1* | 1/2024 | Huber .................... A63B 23/12 |

FOREIGN PATENT DOCUMENTS

| | | | | | |
|---|---|---|---|---|---|
| EP | 1595522 | A1 | | 11/2005 | |
| GB | 2406292 | A | * | 3/2005 | ....... A63B 21/00181 |
| GB | 2596598 | A | * | 1/2022 | ........... A63B 21/078 |
| KR | 101792216 | B1 | | 11/2017 | |
| KR | 101885112 | B1 | | 8/2018 | |
| WO | 9513015 | A1 | | 5/1995 | |
| WO | WO-2005030341 | A1 | * | 4/2005 | ....... A63B 21/00181 |
| WO | 2008040886 | A2 | | 5/2008 | |
| WO | 2014174475 | A1 | | 10/2014 | |
| WO | 2019222630 | A1 | | 11/2019 | |
| WO | 2020115067 | A1 | | 6/2020 | |
| WO | 2020249177 | A1 | | 12/2020 | |
| WO | 2021032848 | A1 | | 2/2021 | |
| WO | 2021047828 | A1 | | 3/2021 | |
| WO | 2021074615 | A1 | | 4/2021 | |
| WO | WO-2021080930 | A1 | * | 4/2021 | ......... A63B 21/0059 |

OTHER PUBLICATIONS

"Force Measurement Gym Workout Equipment," futek.com. https://web.archive.org/web/20210226215011/https://www.futek.com/applications/Force-Measurement-Gym-Workout-Equipment Feb. 26, 2021.

"Building a Load Cell System," rehabtools.org. https://web.archive.org/web/20180604010337/http://www.rehabtools.org/load-cell.html Jun. 4, 2018.

Masters, Tyler. "Smart Fitness Machine," ideaexchange.uakron.edu. Dept. ofEngineering, Honors Research Projects. 493. The Dr. Gary B. and Pamela S.Williams Honors College, The University of Akron: Spring 2017 https://ideaexchange.uakron.edu/cgi/viewcontent.cgi?referer=https://www.google.com/&httpsredir=1&article=1492&context=honors_research_projects.

* cited by examiner

AUTOMATIC SPOTTER LIFT FORCE CALCULATOR AND DISPLAY DEVICE AND METHOD OF USE

FIELD OF THE INVENTION

The present invention relates to the measurement of variable forces acting on a weight machine during exercise.

BACKGROUND OF THE INVENTION

Free weights, such as dumbbells and barbells, are frequently used in training programs to increase strength and endurance. However, traditional weight lifting techniques using free weights often require a spotter to assist when muscle fatigue occurs. The need for a spotter presents a significant problem for weightlifters because it limits the ability to work out alone. The need for a spotter also creates a problem for weightlifters because the amount of weight lifted by the spotter is largely unknown during a workout.

To address these problems, many different types of exercise machines have been developed which use cable or pulley systems coupled with a weight slack. Such exercise machines provide the ability to perform various exercises without requiring a spotter.

For example, the invention disclosed in U.S. Pat. No. 9,138,612 to Breaux describes a multi-station exercise machine which includes a slack adjuster or "spotter" mechanism. The invention disclosed allows a user experiencing muscle fatigue to engage a different set of muscles to relieve the weight being lifted, or "self-spot".

Figure 1:
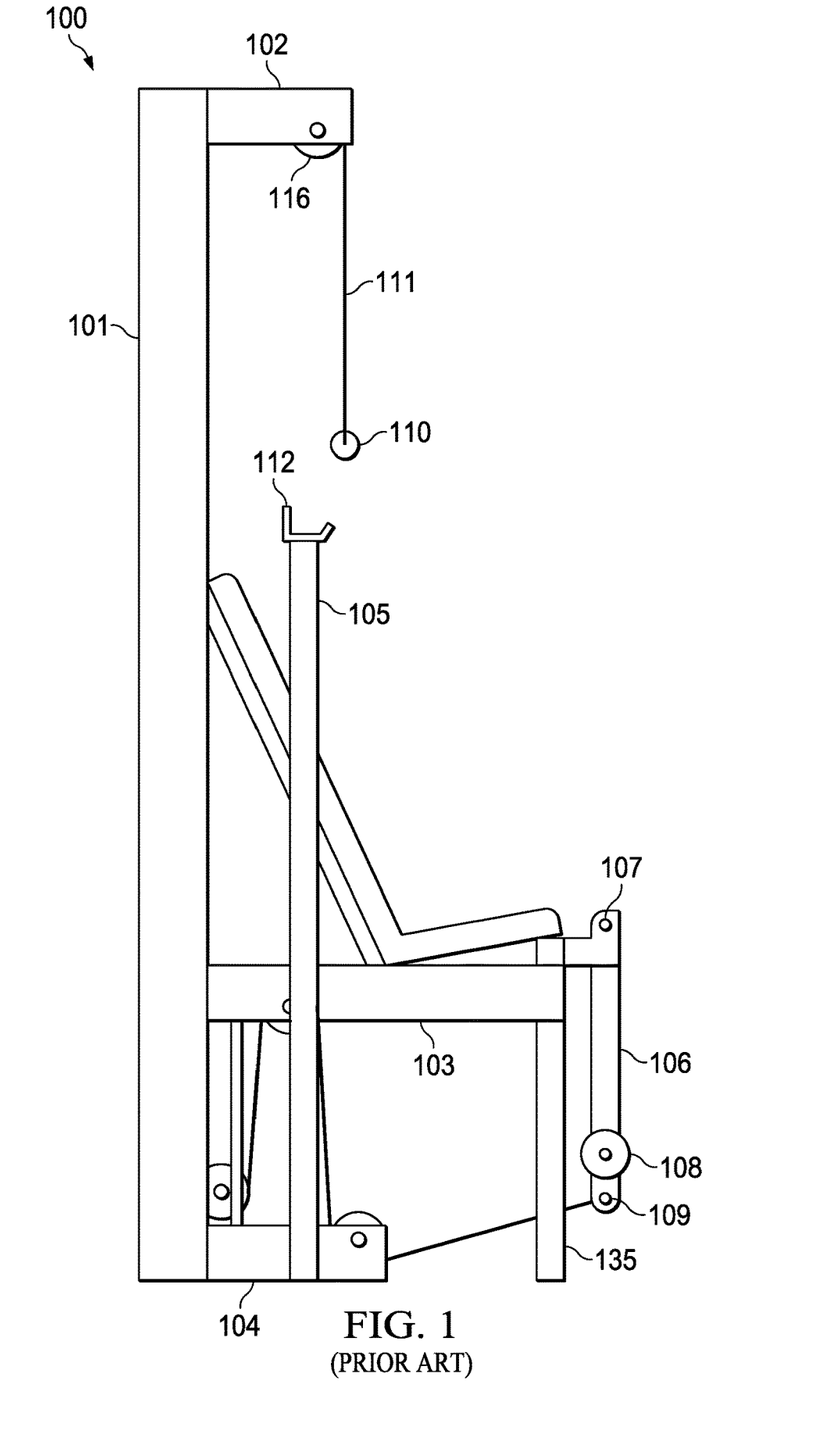
FIG. 1 is a side view of a multi-mode exercise machine in the prior art.

Referring then to FIG. 1, multi-mode exercise machine 100 as known in the prior art is shown in the incline press configuration.

In the incline press configuration, upper support beam 102 is connected to vertical frame post 101 which is connected to lower support beam 104. Seat 103 is supported by vertical frame post 101 and post 135. Spotter extension 106 is connected to the seat at axis 107. Spotter extension 106 includes padded cross bar 108.

Lower support beam 104 is further connected to vertical post 105. Vertical post 105 includes free weight cradle 112. The cradle supports a barbell when it is not being lifted by a user.

Pulley 116 is operatively connected to upper support beam 102. Spotter cable 111 extends through a series of pulleys, such as pulley 116, connected to the support frame. Spotter cable 111 connects to spotter extension 106 via pin connector 109. Spotter cable 111 includes bar clamp 110 which attaches to the center of a barbell.

In use, when muscle fatigue is felt by a user, spotter extension 106 is rotated away from the user along axis 107 by exerting force on padded cross bar 108. Spotter cable 111 is retracted thereby lifting a barbell attached via bar clamp 110 and relieving the weight supported by the user.

Figure 2:
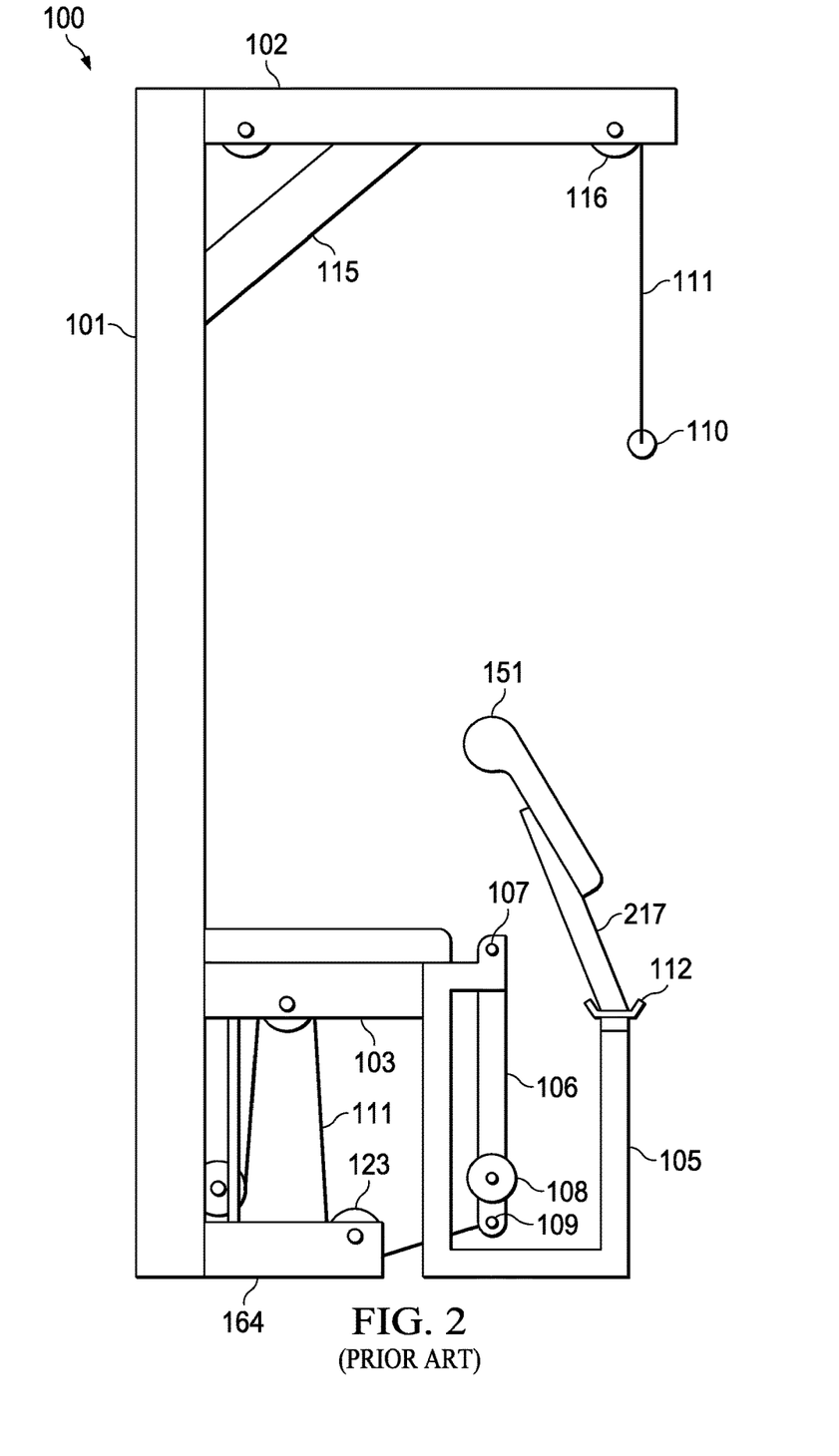
FIG. 2 is a side view of a multi-mode exercise machine in the prior art.

Referring then to FIG. 2, an alternate multi-mode exercise machine 101 as known in the prior art is shown in the preacher curl configuration.

In the preacher curl configuration, upper support beam 102 is connected to vertical frame post 101 which is connected to lower support beam 164. Upper support beam 102 is supported by support brace 115 connected to vertical frame post 101. Seat 103 is supported by vertical frame post 101 and "U"-shaped post 105. Post 105 includes free weight cradle 112. Angled post 217 is connected to post 105. Angled post 217 includes padding 151.

Spotter extension 106 is connected to the seat at axis 107. Spotter extension 106 includes padded cross bar 108.

Pulley 116 is operatively connected to upper support beam 102. Pulley 123 is operatively connected to lower support beam 164. Spotter cable 111 extends through a series of pulleys, such as pulley 116 and pulley 123, connected to the support frame. Spotter cable 111 connects to spotter extension 106 via pin connector 109. Spotter cable 111 includes bar clamp 110 which attaches to the center of a barbell.

In use, when muscle fatigue is felt by a user, spotter extension 106 is rotated away from the user along axis 107 by exerting force on padded cross bar 108. Spotter cable 111 is retracted thereby lifting a barbell attached via bar clamp 110 and relieving the weight supported by the user.

However, the prior art fails to address the problems of measuring the weight lifted by the spotter. Thus, both the actual weight lifted and the spotter force applied by the weightlifter are unknown. This creates a problem because competitive weightlifters need to know the exact amount of weight lifted and the exact amount of the spotter force.

The prior art has attempted to provide a solution to the existing problems. But all have fallen short.

For example, WO Publication No. 2021/0745615 to Hollier discloses an exercise system which displays an upward force exerted on an anchored resistance device. The exercise system described in '615 to Hollier measures the tension force. No external variable force, such as a spotter, is used to relieve muscle fatigue with resistance training. When muscle fatigue occurs, the user simple exerts less force on the resistance device. Therefore, the device does not measure an external and variable spotter force.

As another example, U.S. Pat. No. 4,647,038 to Noffsinger discloses a system for measuring forces exerted between a handgrip and a barbell. The handles are enclosed around the bar and include strain gauges on opposite sides of the bar. Thus, the system will display only one force exerted on the bar, the force downwards, but will not measure an external and variable spotter force.

Thus, there is a need for a weight measuring device that determines and displays the original weight, the spotter force and the resulting weight lifted.

BRIEF DESCRIPTION OF THE DRAWINGS

In the detailed description of the preferred embodiments presented below, reference is made to the accompanying drawings.

DETAILED DESCRIPTION OF THE INVENTION

In the description that follows, like parts are marked throughout the specification and figures with the same numerals, respectively. The figures are not necessarily drawn to scale and may be shown in exaggerated or generalized form in the interest of clarity and conciseness.

Figure 3:
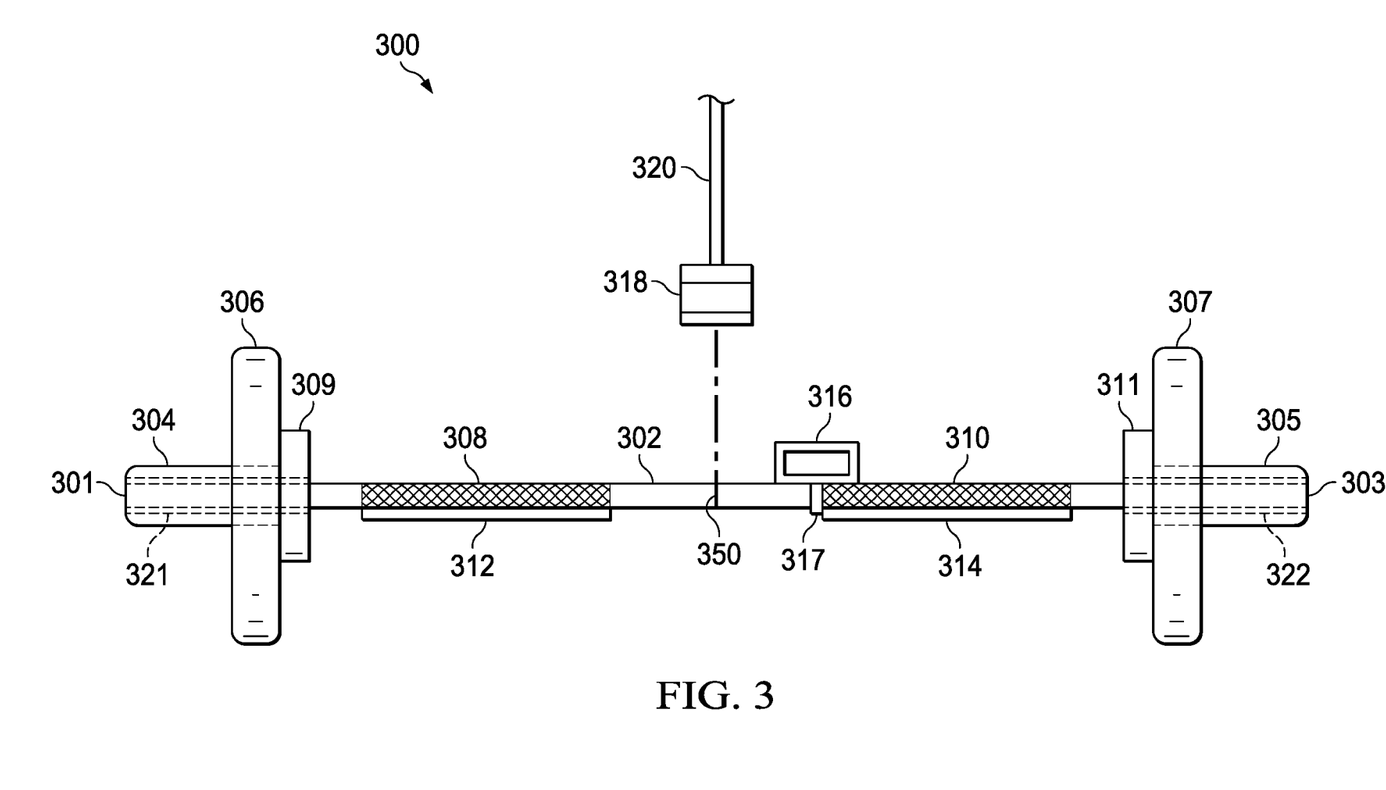
FIG. 3 is a side view of a preferred embodiment of a system for measuring alter weight, a spotter force and a resultant weight lifted.

Referring then to FIG. 3, the configuration of a barbell with a preferred embodiment of a weight display device attached will be described.

Barbell 300 is comprised of steel shaft 302. Steel shaft 302 is typically about 5 to 7 feet long having a diameter of approximately 1 inch. The steel shaft includes grip 308 and grip 310. Grips 308 and 310 are typically knurled sections of the bar.

Barbell 300 is further comprised of sleeve 304 and sleeve 305. Sleeve 304 is connected to end 301 of steel shaft 302. Sleeve 305 is connected to end 303 of steel shaft 302. The sleeves are chrome cylinders coaxial with the steel shaft having a diameter of about 2 inches. Sleeve 304 includes integrally formed collar 309. Sleeve 305 includes integrally formed collar 311.

In a preferred embodiment, sleeves 304 and 305 include bearings 321 and bearings 322. The bearings allow rotation of the sleeves around steel shaft 302 to reduce friction on the users hands as the bar is rotated about its longitudinal axis. Sleeve 304 and sleeve 305 support weight plate 306 and weight plate 307, respectively.

Connected to barbell 300 are sensor 312, sensor 314, and display device 316. Display device 316 is comprised of a screen and microcontroller, as will be further described. The display device is positioned off-center on the barbell. In a preferred embodiment, the display device is removably attached to the steel shaft via clip 317. Alternative methods of attaching the display device may be utilized.

Sensor 312 and sensor 314 each include a strain gauge and are electrically connected to display device 316, as will be further described. In a preferred embodiment, the sensors are removably attached to the steel shaft along grip lines using a suitable industrial adhesive. In alternate embodiments, a single strain gauge may be employed, at either position.

Barbell 300 may be used with the multi-mode exercise machine disclosed in '612 Patent to Breaux. In this configuration, bar clamp 318 attaches spotter cable 320 to barbell 300 at center line 350.

It should be noted that while the invention is shown in use with a barbell, it may also be used with other lifting bars or a multi-mode weight lifting machines, such as a trap bar, a log bar, a Swiss bar, a safety squat bar, a cambered bar, a curl bar, or a tricep bar.

Figure 4A:
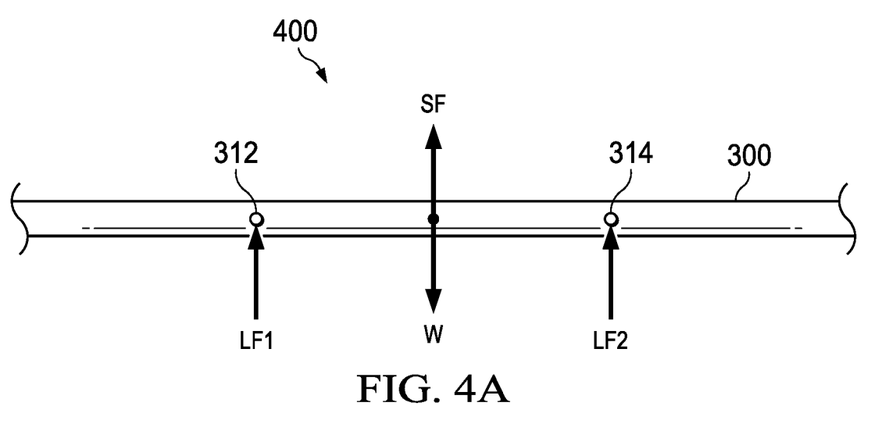
FIG. 4A is a free body diagram of a preferred embodiment.

Referring then to FIG. 4A, an example free body diagram 400 representing the forces exerted on barbell 300 during use will be further described.

In any static situation, the sum of the forces on the free body must equal zero. In this example, lift forces LF1 and LF2 are directed upwards on sensors 312 and 314. LF1+LF2 is equivalent in magnitude, but opposite in direction to the weight of the bar and weights which acts with a downward force W. When a central spotting force, SF, is applied, the free body diagram must still be in equilibrium. Therefore, the sum of forces exerted may be represented by the following equation:

$$LF1+LF2+SF-W=0$$

In this example it is assumed that LF1=LF2. However, it should be appreciated that while the spotting force is depicted as central to the barbell, a spotting force may be applied at one or more positions, such as at either end of the bar. Further, these spotting forces may not be equal. In this case, LF1 may not be equal to LF2 and so the sensors will measure different force values.

Those of skill in the art will recognize that the forces described may be reversed, such as in the case where the lift force is directed downward, such as in a typical trap exercise on a trap machine.

Figure 4B:
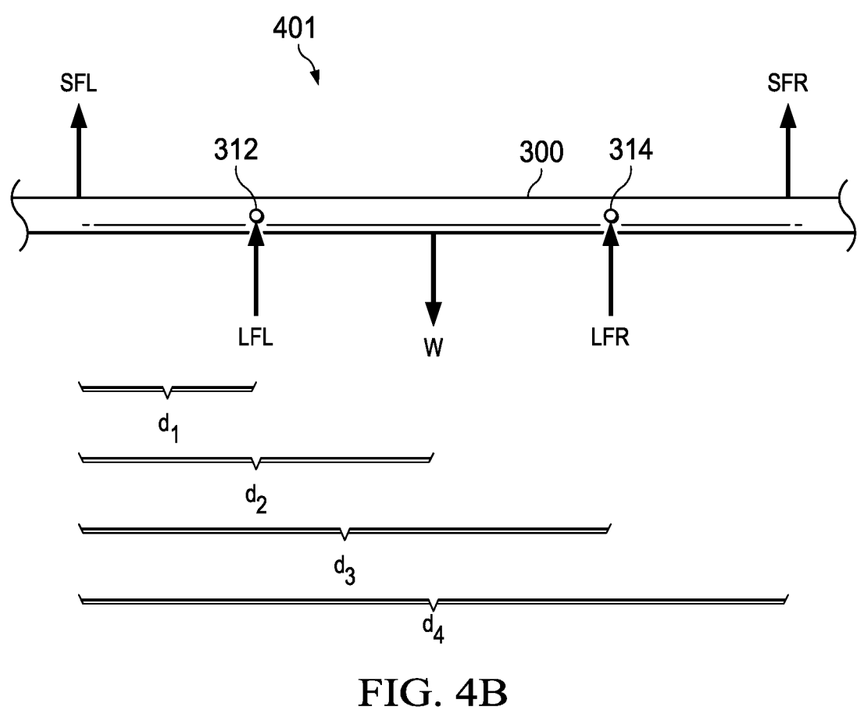
FIG. 4B is a free body diagram of a preferred embodiment.

Referring then to FIG. 4B, an example of free body diagram 401, representing different forces exerted on barbell 300 during use, will be further described.

In this example, lift forces LFL and LFR are directed upwards on sensors 312 and 314. Spotting forces SFL and SFR are directed upward. Weight force W, as a result of gravity, is directed downward.

Force LFL acts at distance d1 from force SFL. Weight force W acts at distance d2 from SFL. Force LFR acts at distance d3 from SFL. Likewise, force SFR acts at distance d4 from force SFL.

Forces W, LFL and LFR are known. Force W is the total weight of the free weights and the bar combined. Force LFL and LFR are available from force sensors 312 and 314, as will be further described.

Assuming the known variables, the following equations of motion apply.

$$\Sigma F: SFL+LFL+LFR+SFR+W=0$$

$$\Sigma M: SFL(0)+LFL(d_1)-W(d_2)+LFR(d_3)+SFR(d_4)=0$$

Where:
$d_1$=the distance between the application point of SFL and LFL;
$d_2$=the distance between the application point of SFL and bar center;
$d_3$=the distance between the application point of SFL and LFR; and,
$d_4$=the distance between the application point of SFL and SFR.

Figure 5A:
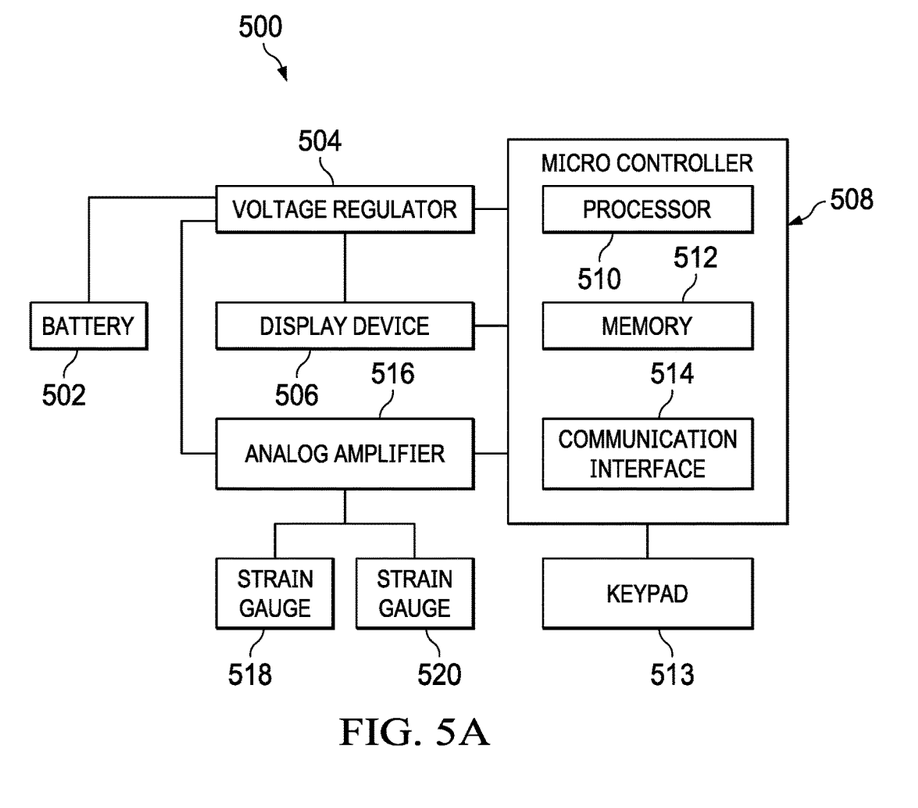
FIG. 5A is a schematic diagram of a preferred a system for measuring actual weight lifted, a spotter force and a resultant weight lifted.

Referring then to FIG. 5A, a schematic of a preferred embodiment of display device 500 will be further described.

Display device 500 is comprised of strain gauge 518 and strain gauge 520 electrically connected to analog amplifier 516. Strain gauges 518 and 520 are located in sensors 312 and 314. In a preferred embodiment, analog amplifier 516 is a high precision load cell weight sensor having two channel input and capable of providing a digital output, such as the HX711 by Avia Semiconductor of China.

Analog amplifier 516 is further connected to microcontroller 508. Battery 502 is connected to display 506, microcontroller 508 and analog amplifier 516 through voltage regulator 504. In a preferred embodiment, display 506 is a low power LCD, or a super twisted nematic LCD, such as part no. NHD-0208AZ-RN-YBW-33 available from Newhaven Display Intl of Elgin, Illinois. However, alternative screen types may be used, such as LED or OLED.

Microcontroller 508 is comprised of processor 510, memory 512, and communication interface 514. Memory 512 includes an operating system for the micro controller and a set of program instructions, which, when executed by the microcontroller, carry out the functions of the invention. In one embodiment, communication interface 514 includes Bluetooth capabilities to connect with a wireless device, such as a smartphone, as will be further described.

Microcontroller 508 is also operatively connected to keypad 513. In a preferred embodiment, keypad 513 is a compact alphanumeric keypad, such as keypad switch GS120203 by Storm Interface of Maldon, England.

Figure 5B:
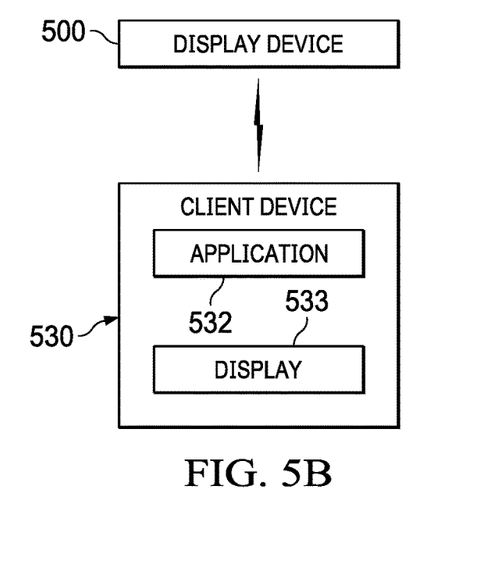
FIG. 5B is a network diagram of a system for measuring actual weight lifted, a spotter force and a resultant weight lifted.

Referring then to FIG. 5B, a network diagram for an alternate embodiment of a system incorporating the display device will be further described.

Display device 500 is wirelessly connected to client device 530. Client device 530 is a smart device such as a smartphone or tablet. In a preferred embodiment, client device 530 includes application 532 which when activated connects the client device to display device 500 via Bluetooth. Client device 530 further comprises onboard display 533 which is controlled by application 532. In this embodiment, data indicating the actual weight, the spotter force and the resultant weight lifted are sent to the client device wirelessly where they are stored and displayed.

Figure 6A:
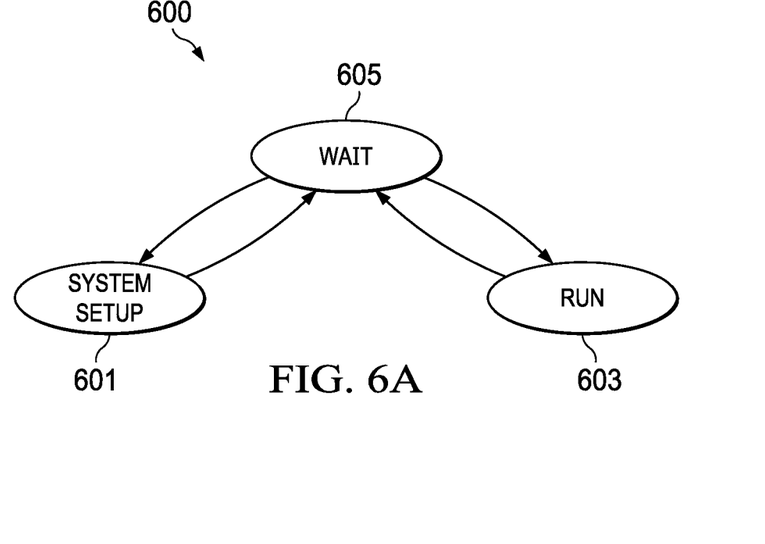
FIG. 6A is a state chart implemented by a preferred embodiment.

Referring to FIG. 6A, preferred a mode selection state chart will be further described.

At system start-up, microcontroller 508 enters wait state 605. During wait state 605, microcontroller 508 monitors keypad 513 for entry of a state selection.

In a preferred embodiment, two-state selections are available, system startup state 601 and run state 603.

Upon selection of system startup state 601, the processor polls the keypad for data entry, as will be further described. On completion of system startup state 601, the processor returns to wait state 605.

Upon selection of run state 603, the processor loads and executes a set of instructions that carry out the functions of the device, as will be further described. Upon completion of run state 603, the microcontroller returns to wait state 605.

Figure 6B:
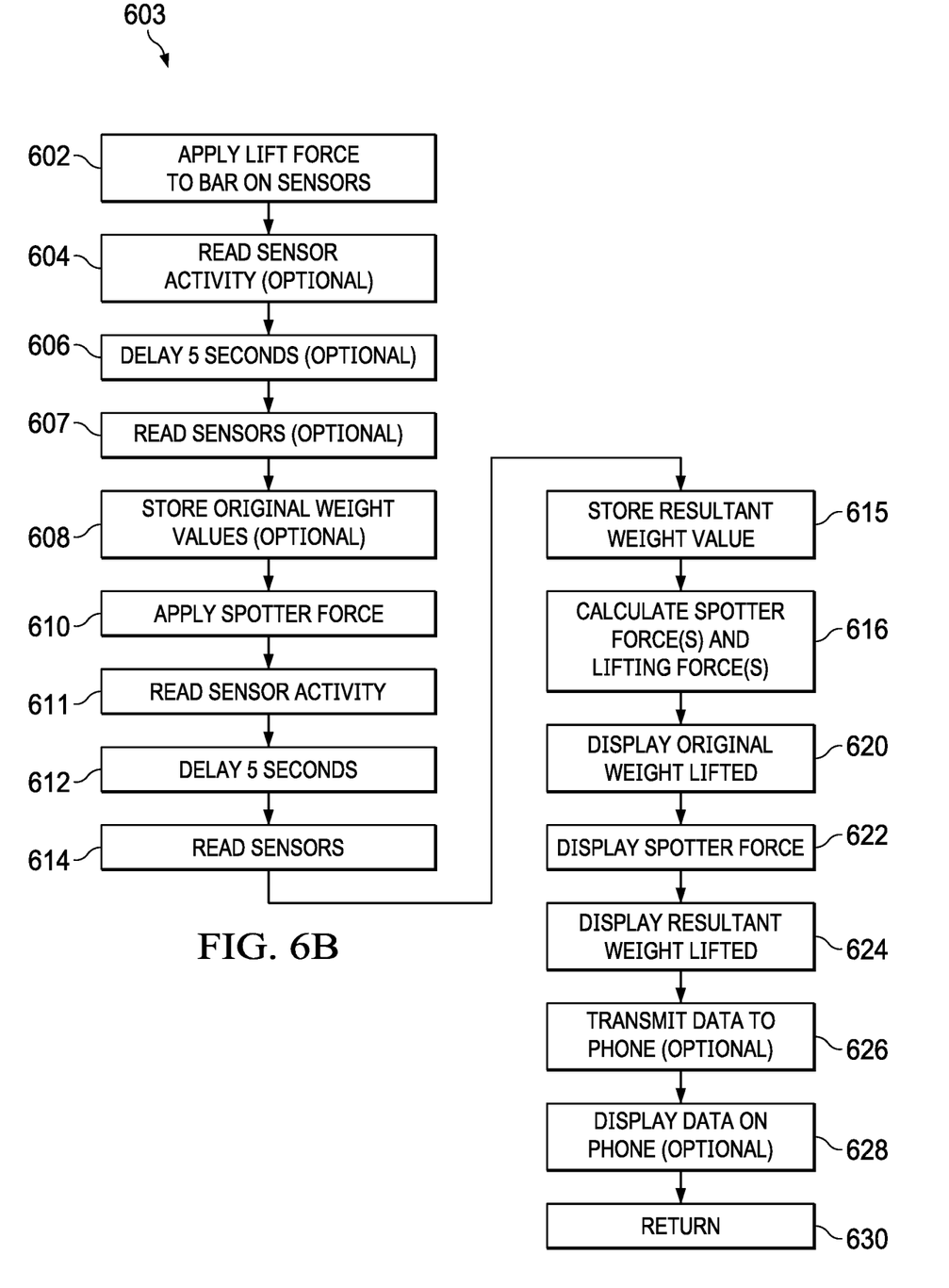
FIG. 6B is a flowchart of a preferred method for determining an actual weight lifted, a spotter force and a resultant weight lifted.

Referring to FIG. 6B, run state 603 will be further described.

At step 602, a force is applied to the bar on each of the left and right sensors.

Steps 604 through 608 are optional, and are carried out only if, during setup, no total weight amount is entered.

At optional step 604, the processor reads sensor activity.

At optional step 606, the processor delays for about five seconds, in order to allow sufficient time for the force on the bar to stabilize between the right and left sensors. Other delay times may be used.

At optional step 607, the processor reads both right and left sensors from the analog amplifier and converts them to a digital weight measurement value.

At optional step 608, the processor stores the original weight values for each of the right and left sensors.

At step 610, a spotter force or spotter forces are applied to the bar.

At step 611, the processor then again reads the sensor activity.

At step 612, the processor again delays about five seconds in order to allow the spotter forces to stabilize. Other delay times may be used.

At step 614, the processor again reads the right and left sensors from the analog amplifier and converts them to a digital weight measurement value.

At step 615, the processor stores resultant weight values for each of the left and right sensors.

At step 616, the processor calculates the spotter forces and the left and right lifting forces as may be required. In a preferred embodiment, the following equations are computed to determine the amount of weight lifted with no spotter forces applied.

$$LFL_1 + LFR_1 = LFTOTAL$$

Where:
$LFL_1$=left sensor value as weight is lifted with no spotter forces applied;
$LFR_1$=right sensor value as weight is lifted with no spotter forces applied; and,
LFTOTAL=original weight lifted.

The following equations are computed to determine the spotter force applied.

$$LFL_2 + LFR_2 = LFRESULTANT$$

Where:
$LFL_2$=left sensor value after spotter force is applied;
$LFR_2$=right sensor value after spotter force is applied; and,
LFRESULTANT=the resulting weight lifted after application of the spotter force.

$$LFSPOTTER = LFTOTAL - LFRESULTANT$$

Where:
LFSPOTTER=spotting force.

In situations where there are more than one spotting force is applied and the lifting and spotting forces at the sensors differ, the following equations are computed:
Where:
$LFL_1$=original left sensor value;
$LFR_1$=original right sensor value; and,
LFTOTAL=original weight lifted.

The following equations are computed to determine the spotter forces applied:

$$SFL = W - LFL - LFR + \left( \frac{LFLd_1 + LFRd_3 - Wd_2}{d_4} \right)$$

$$SFR = W - LFL - LFR - SFL$$

Where:
SFL=spotter force left;
SFR=spotter force right;
W=weight value retrieved from memory;
LFL=lifting force left;
LFR=lifting force right;
$d_1$=the distance between the application point of SFL and LFL;
$d_2$=the distance between the application point of SFL and bar center;
$d_3$=the distance between the application point of SFL and LFR; and,
$d_4$=the distance between the application point of SFL and SFR.

At step 620, the processor sends a signal to the display to indicate the original weight lifted.

At step 622, the processor sends a signal to the display to indicate the total spotter force. In another embodiment, spotter force for each of the left and right sensors is displayed.

At step 624, the processor sends a signal to the display to indicate the resultant weight lifted. In another embodiment, the resultant weight lifted at each of the left and right sensors is displayed.

At step 626, optionally, the processor transmits the display data to the smartphone via communication interface 514.

At step 628, the smartphone receives the display data through its own communication interface and displays it via application 532.

At step 630, the processor returns to mode selection.

Figure 6C:
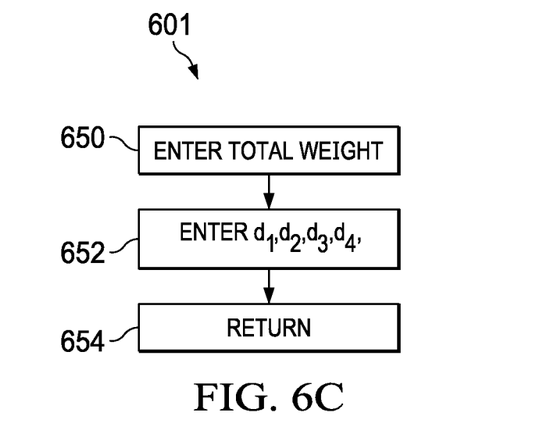
FIG. 6C is a flowchart of a preferred method of system startup.

Referring then to FIG. 6C, system startup state 601 will be further described.

At step 650, processor 510 polls keypad 513 for an entry of the total weight of the bar and the weight plate to be lifted by the user.

At step 652, processor 510 polls keypad 513 for entry of distances $d_1$, $d_2$, $d_3$, and $d_4$.

At step 654, the processor returns to wait state 605.

The invention claimed is:

1. A system for a weight lifting bar connected to a spotter machine, comprising:
    a display device comprising:
        a processor, operatively connected to a memory; and
        a display screen, operatively connected to the processor; and
    a sensor set, positioned on the weight lifting bar, operatively connected to the processor of the display device;
    the processor configured to:
        receive a first sensor signal from the sensor set;
        determine a first exerted force, in a first direction, based on the first sensor signal, the first exerted force comprising a force exerted by a user on the weight lifting bar before a force is applied by the spotter machine on the weight lifting bar;
        receive a second sensor signal from the sensor set;
        determine a second exerted force, in a second direction, based on the second sensor signal, the second exerted force comprising a force exerted by the user on the weight lifting bar after a force is applied by the spotter machine on the weight lifting bar;
        determine a spotter force based on the first exerted force and the second exerted force;
        display, on the display screen, a first value related to the spotter force; and
        display, on the display screen, a second value related one of the first exerted force and the second exerted force.

2. The system of claim 1 wherein:
    the first sensor signal further comprises a first right sensor signal and a first left sensor signal, and
    wherein the processor is further configured to:
    sum the first right sensor signal and the first left sensor signal.

3. The system of claim 2 wherein:
    the second sensor signal further comprises a second right sensor signal and a second left sensor signal, and
    wherein the processor is further configured to:
    sum the second right sensor signal and the second left sensor signal.

4. The system of claim 2 wherein the spotter force further comprises a left spotter force and a right spotter force.

5. The system of claim 1 wherein the sensor set comprises a first strain gauge and a second strain gauge.

6. The system of claim 5 wherein the first exerted force is a sum of a first signal from the first strain gauge and a second signal from the second strain gauge.

7. The system of claim 1 wherein the display device further comprising a communication interface, operatively connected to the processor, configured to:
    transmit the first exerted force, the second exerted force, and the spotter force to an external device, wherein the external device is configured to display one of the first exerted force, the second exerted force, and the spotter force.

8. The system of claim 1 wherein the display device is removably connected to the weight lifting bar at an off center position.

9. A system for a weight lifting bar connected to a spotter machine, comprising:
    a display device comprising:
        a processor, operatively connected to a memory; and
        a display screen, operatively connected to the processor;
    a sensor set, positioned on the weight lifting bar, operatively connected to the processor of the display device;
    the processor configured to:
        receive a first sensor signal from the sensor set;
        determine a first exerted force, in a first direction, based on the first sensor signal, the first exerted force comprising a force exerted by a user on the weight lifting bar before a force is applied by the spotter machine on the weight lifting bar;
        receive a second sensor signal from the sensor set;
        determine a second exerted force, in a second direction, based on the second sensor signal, the second exerted force comprising a force exerted by the user on the weight lifting bar after a force is applied by the spotter machine on the weight lifting bar;
        calculate a difference between the first exerted force and the second exerted force to determine a spotter force; and
        display, on the display screen, a first value related to the spotter force determined.

10. A system for a weight lifting bar, the weight lifting bar connected to a cable, the cable connected to a spotter machine, the system comprising:
    a display device comprising:
        a processor, operatively connected to a memory; and
        a display screen operatively connected to the processor;
    a sensor set, positioned on the weight lifting bar, operatively connected to the processor of the display device; and
    the processor configured to:
        receive a first sensor signal from the sensor set;
        determine a first exerted force, in a first direction, based on the first sensor signal, the first exerted force comprising a force exerted by a user on the weight lifting bar before a force is applied by the spotter machine on the weight lifting bar;
        receive a second sensor signal from the sensor set;
        determine a second exerted force, in a second direction, based on the second sensor signal, the second exerted force comprising a force exerted by the user on the weight lifting bar after a force is applied by the spotter machine on the weight lifting bar via the cable;
        determine a spotter force based on the first exerted force and the second exerted force, and
        display, on the display screen, a first value related to the spotter force.

11. A system for a weight lifting bar connected to a spotter machine, comprising:
    a display device comprising:
        a processor, operatively connected to a memory; and
        a display screen, operatively connected to the processor;
    a sensor set, positioned on the weight lifting bar, operatively connected to the processor of the display device;

the processor configured to:
receive a first sensor signal from the sensor set;
determine a first exerted force, in a first direction, based on the first sensor signal, the first exerted force comprising a force exerted by a user on the weight lifting bar before a force is applied by the spotter machine on the weight lifting bar;
receive a second sensor signal from the sensor set;
determine a second exerted force, in a second direction, based on the second sensor signal, the second exerted force comprising a force exerted by the user on the weight lifting bar after a force is applied by the spotter machine on the weight lifting bar;
determine a spotter force based on the first exerted force and the second exerted force; and
display, on the display screen, a first value related to the spotter force;
wherein the first sensor signal-further comprises a first right sensor signal and a first left sensor signal, and the second sensor signal comprises a second right sensor signal and a second left sensor signal, the first right sensor signal being about equal to the first left sensor signal; and
wherein the processor is further configured to:
sum the first right sensor signal and the first left sensor signal;
and
sum the second right sensor signal and the second left sensor signal.

12. A system for a weight lifting bar connected to a spotter machine, comprising:
a display device comprising:
a processor, operatively connected to a memory; and
a display screen, operatively connected to the processor;
a sensor set, positioned on the weight lifting bar, operatively connected to the processor of the display device;
the processor configured to:
receive a first sensor signal from the sensor set;
determine a first exerted force, in a first direction, based on the first sensor signal, the first exerted force comprising a force exerted by a user on the weight lifting bar before a force is applied by the spotter machine on the weight lifting bar;
receive a second sensor signal from the sensor set;
determine a second exerted force, in a second direction, based on the second sensor signal, the second exerted force comprising a force exerted by the user on the weight lifting bar after a force is applied by the spotter machine on the weight lifting bar;
determine a spotter force based on the first exerted force and the second exerted force; and
display, on the display screen, a first value related to the spotter force;
wherein the first sensor signal comprises a first right sensor signal and a first left sensor signal, and the second sensor signal comprises a second right sensor signal and a second left sensor signal, the right sensor signal being about equal to the left sensor signal, and
wherein the processor is further configured to:
sum the first right sensor signal and the first left sensor signal;
and
sum the second right sensor signal and the second left sensor signal.

13. A method of determining forces exerted on a weight lifting bar connected to a spotter machine, comprising:
providing a display device comprising:
a processor, operatively connected to a memory; and
a display screen, operatively connected to the processor;
positioning a sensor set, on the weight lifting bar, the sensor set being operatively connected to the processor of the display device; and
receiving, by the processor, a first sensor signal from the sensor set;
determining, by the processor, a first exerted force, in a first direction, based on the first sensor signal, the first exerted force comprising a force exerted by a user on the weight lifting bar before a force is applied by the spotter machine on the weight lifting bar;
receiving, by the processor, a second sensor signal from the sensor set;
determining, by the processor, a second exerted force, in a second direction, based on the second sensor signal, the second exerted force comprising a force exerted by the user on the weight lifting bar after a force is applied by the spotter machine on the weight lifting bar;
determining, by the processor, a spotter force based on the first exerted force and the second exerted force;
displaying, on the display screen, a first value related to the spotter force; and
displaying, on the display screen, a second value related to one of the first exerted force and the second exerted force.

14. The method of claim 13 wherein the sensor set comprises a first strain gauge and a second strain gauge.

15. The method of claim 14 wherein the step of determining, by the processor, the first exerted force comprises summing a first signal from the first strain gauge and a second signal from the second strain gauge.

16. The method of claim 13:
wherein receiving, by the processor, the first sensor signal further comprises receiving, by the processor, a first right sensor signal and a first left sensor signal; and
wherein the method further comprises:
summing, by the processor, the first right sensor signal and the first left sensor signal.

17. The method of claim 16 wherein
receiving, by the processor, the second sensor signal further comprises receiving a second right sensor signal and a second left sensor signal; and wherein the method further comprises:
summing, by the processor, the second right sensor signal and the second left sensor signal.

18. The method of claim 13 wherein the display device further comprises a communication interface, operatively connected to the processor, and wherein the method further comprises:
transmitting, by the communication interface, the first exerted force, the second exerted force, and the spotter force to an external device; and
displaying, at the external device, the first exerted force, the second exerted force, and the spotter force.

19. The method of claim 13 wherein the spotter machine comprises a cable, connected to the weight lifting bar, and the spotter machine applies a force on the weight lifting bar via the cable.

20. The method of claim 13 further comprising connecting the display device to the weight lifting bar at an off-center position.

21. A method of determining forces exerted on a weight lifting bar connected to a spotter machine, comprising:
providing a display device comprising:

a processor, operatively connected to a memory; and
a display screen, operatively connected to the processor;
positioning a sensor set, on the weight lifting bar, the sensor set being operatively connected to the processor of the display device;
receiving, by the processor, a first sensor signal from the sensor set;
determining, by the processor, a first exerted force, in a first direction, based on the first sensor signal, the first exerted force comprising a force exerted by a user on the weight lifting bar before a force is applied by the spotter machine on the weight lifting bar;
receiving, by the processor, a second sensor signal from the sensor set;
determining, by the processor, a second exerted force, in a second direction, based on the second sensor signal, the second exerted force comprising a force exerted by the user on the weight lifting bar after a force is applied by the spotter machine on the weight lifting bar;
determining, by the processor, a spotter force based on the first exerted force and the second exerted force; and
displaying, on the display screen, a first value related to the spotter force;
wherein the step of determining the spotter force further comprises calculating a difference between the first exerted force and the second exerted force.

* * * * *